United States Patent [19]

Peinetti

[11] Patent Number: 6,151,276
[45] Date of Patent: *Nov. 21, 2000

[54] ECHO-RANGING ELECTRONIC BOUNDARY SYSTEM

[75] Inventor: Donald Peinetti, Chester Springs, Pa.

[73] Assignee: IFCO Enterprises, Inc., Malvern, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/995,085

[22] Filed: Dec. 19, 1997

[51] Int. Cl.$^7$ .......................... H04B 13/00; A01K 15/04
[52] U.S. Cl. .......................... 367/139; 119/721; 119/908; 340/573.3
[58] Field of Search ........................... 367/139; 119/720, 119/721, 908; 340/573.1, 573.3

[56] References Cited

U.S. PATENT DOCUMENTS

| | | | |
|---|---|---|---|
| 3,980,051 | 9/1976 | Fury | 119/721 |
| 4,898,120 | 2/1990 | Brose | 119/721 |
| 5,121,711 | 6/1992 | Aine | 119/721 |
| 5,241,923 | 9/1993 | Janning | 119/721 |
| 5,495,427 | 2/1996 | Puma et al. | 364/516 |
| 5,708,421 | 1/1998 | Boyd | 340/573 |
| 5,868,100 | 2/1999 | March | 119/421 |

OTHER PUBLICATIONS

Ried, Katie, "My Cat is Special To Me, But There Are Some Places I Don't Want Her To Go!", *Technology Update*, publication date unknown.

"Now You Can Keep Pets Off Furniture, Cars, Food Areas and Plants!"—Radio Fence—Indoor Containment Systems Website (www.radiofence.com/indoor.htm), publication date unknown.

*Primary Examiner*—Ian J. Lobo
*Attorney, Agent, or Firm*—Duane, Morris & Heckscher, LLP

[57] ABSTRACT

An echo-ranging boundary system is provided for controlling the access of animals to predefined areas. An electronic transponder collar is affixed to an animal for exclusion from a predefined area. An ultrasonic beacon, defining a transmission reference point, periodically transmits a directional ultrasonic interrogation signal for determining the location of animals provided with transponder collars. The transponder collar emits an ultrasonic reply signal, detected by the station after a period of time defined by the propagation delay of the ultrasonic reply signal. The propagation delay of the reply signal is directly proportional to the distance between the transponder and the interrogation signal reference point. A timing threshold is set at the transmission station corresponding to a desired control distance. Reply signals returned before a device time-out are compared to the timing threshold. If the elapsed time of the propagated reply signal is less than the user selected threshold a correction pulse is transmitted to the animal transponder collar.

17 Claims, 7 Drawing Sheets

ECHO-RANGING ELECTRONIC BOUNDARY SYSTEM

FIELD OF THE INVENTION

This invention relates to animal control systems utilizing an electronic stimulus for controlling an animal's access to a predefined area. More particularly, the present invention relates to an ultrasonic ranging system wherein a centrally located communication beacon transmits an ultrasonic interrogation signal to determine the distance between the beacon and an animal equipped with an electronic transponder collar. The transponder collar emits an ultrasonic reply signal for reception by the beacon, the reply signal delayed in proportion to the animal's distance from the communication beacon, upon the detected propagation delay of the reply signal dropping below a user selectable threshold, an electronic stimulus is enabled by the communication beacon and delivered to the transponder collar to activate a stimulus delivery circuit.

BACKGROUND OF THE INVENTION

Electronic animal control systems are known in which a radio frequency receiver collar is attached to an animal to limit the movement of the animal within a predetermined area of confinement. Traditionally, the predetermined area is configured through the physical arrangement of a subterranean transmission antenna which transmits a unique electromagnetic signal produced by an operably linked transmitting device. The transmission pattern of the subterranean antenna creates zones of transmission, or area "boundaries," in which the attached animal receiver collar is responsive to the uniquely transmitted electromagnetic signal. Upon entering a predetermined limit area, the receiver collar is adapted to detect the unique electromagnetic signal and, in response, deliver a correction stimulus, such as a mild shock or audible signal, to the animal. The effect of the repeated stimulus teaches the animal, such as a dog, to avoid the limit areas thus confining the animal without use of physical fences or barriers.

Alternatively, variations of this technology are known to keep animals out of small predefined areas such as outdoor patios and decks, as well as indoor rooms such as nurseries and home offices. In these applications a radio frequency transmission station is located in a room or area in which animals are to be excluded. The omnidirectional transmission of the RF signal creates a spherical zone of transmission or "exclusion area" in which the attached animal's radio frequency receiver collar is responsive to the uniquely transmitted electromagnetic signal. Upon entering the predetermined area, the receiver collar is adapted to detect the unique electromagnetic signal and, in response, deliver a correction stimulus to the animal.

Presently, design limitations inherent to such radio frequency systems has affected their reliability and effectiveness. One limitation of these pet containment/barrier systems is the incidental conductive structures present in most containment/barrier environments. These structures can couple and re-radiate the radio frequency signal into undesired areas. The incidental structures function as "coupling structures" relative to the RF transmitter signal radiated from the transmission station antenna. For example, residential locations are supplied with various utilities, such as water, cable television, electrical power, telephone service, and the like, by overhead or subterranean conductors (conduit, pipes, wires, cables, etc.) that cross property lines of the residence and then are distributed throughout the residence. Depending upon the topology of the conductors or their proximity to the transmitting antenna along their respective routes, the transmitter signal can induce a similar signal within such conductors. The conductors may then, in effect, distribute the transmitter signal to undesired locations at the residence by re-radiating the induced signal along their respective routes.

The primary undesirable result of the presence of incidental coupling structures is that the animal occasionally receives the correction stimulus in areas where the stimulus is not intended to be applied. The constant presence of the RF stimulus enable signal further contributes to the probability that the collar stimulus will occasionally be delivered accidentally. Such unintended stimulation of a dog can habituate the dog to being stimulated by the receiver, thus contributing to the decreased effectiveness of the RF electronic animal control system to control the dog. Additionally, such unintended simulation can contribute to undesirable behavior of the dog.

A further limitation of RF based systems is the inability these systems to precisely direct or configure the detection zone created by the RF transmission pattern. The RF signal is omnidirectionally radiated, creating a spherical transmission pattern emanating from the point of origin, or transmission antenna. Thus, systems are unable to focus their transmissions in the direction of an animals likely approach such as a doorway. Moreover, depending on the orientation of the collar, the collar may detect transmission levels of varying intensity. For example, when an animal raises and lowers its head the collar travels through the spherically radiated magnetic flux lines of the RF antenna, causing the animals collar to detect an RF signal of varying intensity.

The system in accordance with the present invention is provided for the exclusion/containment of animals to a predefined area. A directional ultrasonic transmission station defining a transmission reference point, selectively transmits a stimulus transmission in response to an ultrasonic animal collar transponder signal calculated to be in the predefined range of the transmission reference point by the transmission station.

SUMMARY OF THE INVENTION

An echo-ranging system for the exclusion of animals is provided for ultrasonically detecting the movement and location of an animal relative to a communication beacon. The communication beacon is located within an area in which animals are to be excluded to deliver a ultrasonic burst of sound uniformly about its perimeter or in a specific direction. A transponder, i.e. a receiver-transmitter, is carried by the animal for receiving communication beacon interrogation transmissions and responsively transmitting ultrasonic reply signals. The delay in reception of the ultrasonic reply signals by the communication beacon is directly proportional to the distance between the communication beacon and the animal equipped with the transponder collar, as sound propagation through the atmosphere is a known constant. A timing threshold is set at the transmission station corresponding to a desired control distance. Reply signals returned before a device time-out are compared to the timing threshold. If the elapsed time of the propagated reply signal is less than the user selected threshold a correction signal is selectively transmitted to the animal transponder collar, enabling a control stimulus, such as an audible warning or an electrical shock, to the animal. In other embodiments, the transponder collar may deliver an audible alarm and electronic shock to the animal simultaneously to further reinforce the animal's association of an undesirable sound and stimulus with a specific exclusion area.

The transponder collar includes a CPU (Central Processing Unit) for interpreting ultrasonic transmissions of the ultrasonic receiver/transmitter circuitry. The transponder collar also includes a stimulus delivery section for controlling the behavior of an animal. The transponder collar is responsive to the interrogation signals of the communication beacon, when no interrogation signal is detected the collar is in a low power idle state. Upon detection of the communication beacon interrogation signal, the transponder replies, transmitting an ultrasonic reply to the communication beacon. If the reply signal indicates to the communication beacon that the animal is located within a predefined proximity to the communication beacon, the beacon communicates an enable signal to activate the stimulus delivery section of the transponder collar for correcting the animal.

The communication beacon also includes a CPU for the monitoring and comparison of propagation delay times to user selected thresholds required to determine the location of an animal relative to the communication beacon. The communication beacon determines the location of an animal by transmitting an ultrasonic interrogation signal to one or more responsive animal transponder collars. The transponder collars detect the ultrasonic interrogation signal and emits a reply signal to the communication beacon. The reception of the reply signal by the communication beacon is delayed by a time proportional to the animal's distance from the communication beacon. The duration of the delay is calculated by the processor and compared to a user selected threshold, if the elapsed time of the propagated reply signal is less than the user selected threshold a correction pulse is selectively enabled by the communication beacon transmitter section and delivered to the animal transponder collar activating the stimulus delivery section.

BRIEF DESCRIPTION OF THE DRAWINGS

The foregoing summary, as well as the following detailed description of the preferred embodiments of the present invention, will be better understood when read in conjunction with the accompanying drawings in which.

DETAILED DESCRIPTION OF THE PREFERRED EMBODIMENTS

Figure 1:
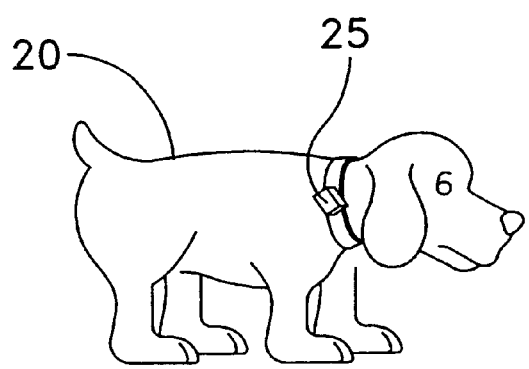
FIG. 1 is a schematic diagram of the echo-ranging electronic boundary system for the exclusion of animals.
Figure 1:
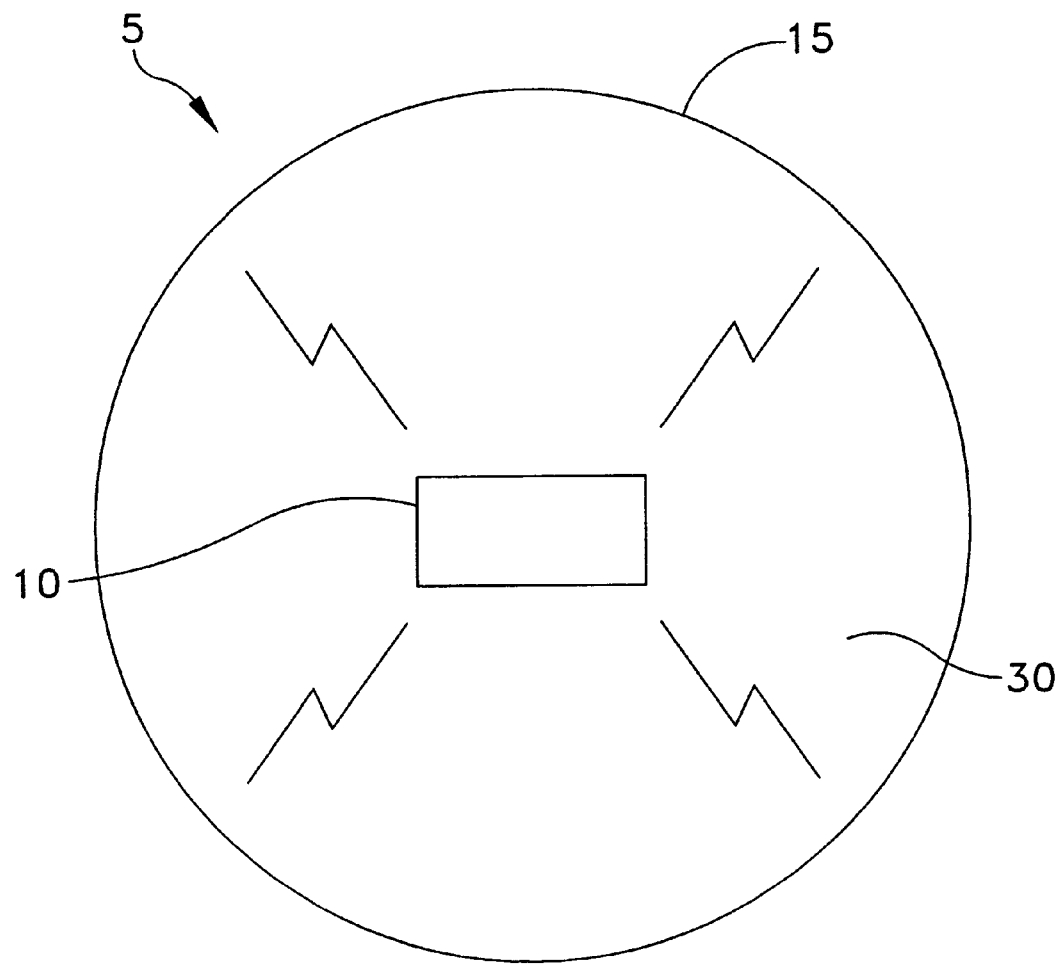

An echo-ranging boundary system, generally designated 5 is provided for the exclusion of animals 20, such as a dog, from a predefined area 30. Specifically, an electronic transponder collar 25 is affixed to an animal 20 desired to be excluded from the predefined area 30. An ultrasonic transmission beacon 10 is positioned within the predefined area 30, establishing a transmission reference point. The beacon 10 periodically transmits an ultrasonic interrogation signal for determining the location of animals 20 equipped with the transponder collars 25 relative to the reference point. The transponder collars 25, i.e. a receiver-transmitter, is carried by the animal 20 for receiving communication beacon interrogation transmissions and responsively transmitting ultrasonic reply signals. Animals 20 are detected as breaching a predefined area boundary 15 by determining the propagation delay of the reply signal relative to the initial transmission of the interrogation signal by the beacon 10. The propagation delay of the reply signal is proportional to the distance between the beacon 10 and the collared animal 20. Upon detection of a transponder reply signal having a propagation delay indicating the position of the animal 20 as venturing into the predefined area 30 by crossing boundary 15, the beacon transmits a stimulus enable signal to the transponder collar 25. The stimulus enable signal activates the transponder collar 25 to deliver a control stimulus to the animal 20, the stimulus being an audible warning or an electrical shock.

Referring now generally to FIG. 1, an echo-ranging system for the exclusion of animals 20 is shown for ultrasonically detecting the movement and location of an animal relative to a communication beacon 10. In the preferred embodiment an ultrasonic burst of acoustic energy is transmitted by the beacon 10 throughout area 30 as an interrogation signal for determining the distance between transponder collars 25 and the beacon 10. The communication beacon 10 is centrally positioned within an area in which animals are to be excluded to deliver the ultrasonic burst of sound uniformly about its perimeter. In an alternative embodiment, the beacon 10 may be located to facilitate the positioning of individual ultrasonic transducers such that non-uniform user defined exclusion zones are created by individually positioning the ultrasonic transducers of beacon 10. For example, transducers may be positioned to transmit in the direction of a single doorway or window of a predefined area. The predefined areas may be indoors such as a bedroom, nursery, or home office, or outdoors such as a patio, deck, or pool area.

Transmission Beacons

Figure 2:
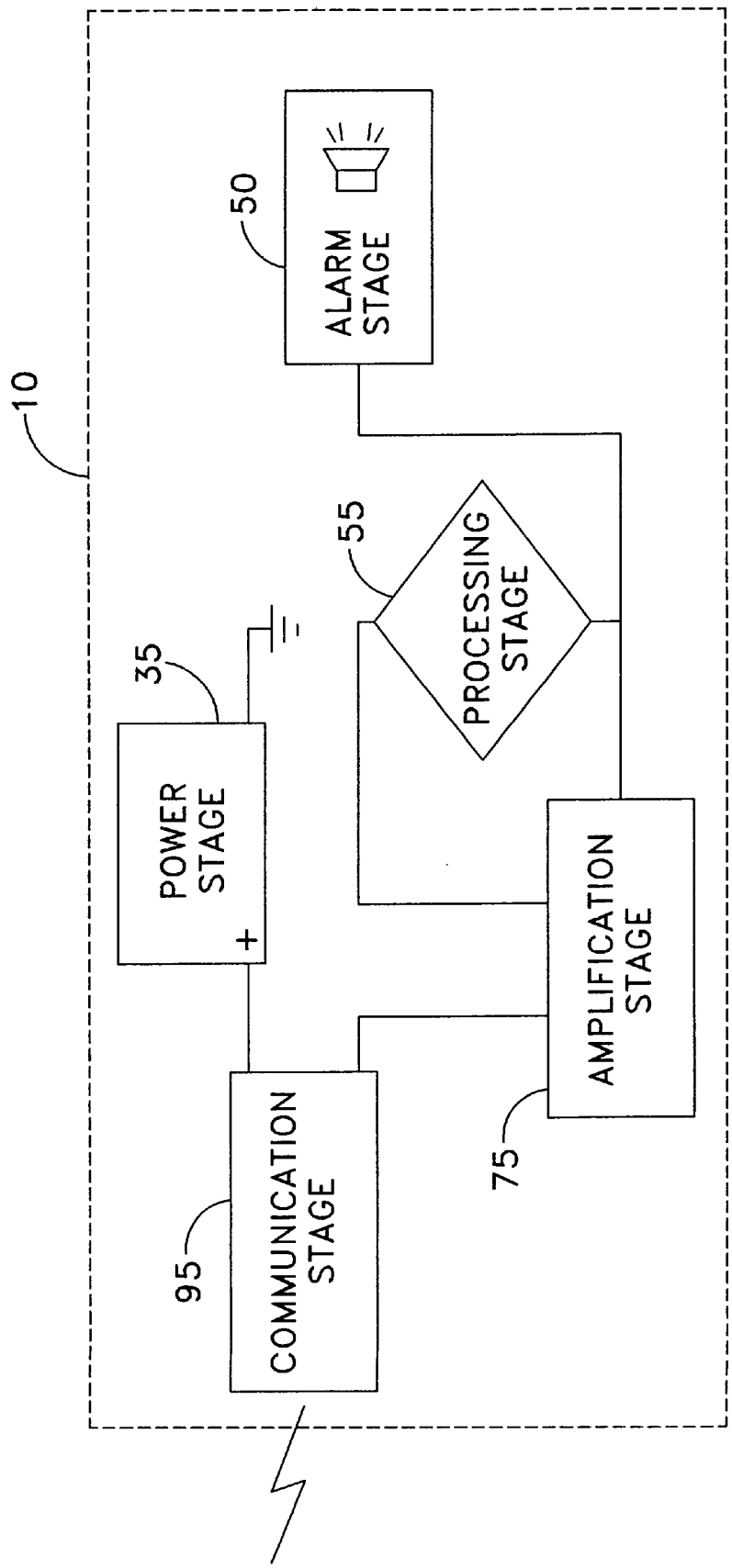
FIG. 2 is a functional block diagram of the communication beacon of the echo-ranging electronic boundary system for the exclusion of animals of FIG. 1.

Referring now to FIGS. 1 and 2, an ultrasonic transmission beacon 10 is located in a predefined area 30 to define a reference point. The location of the beacon 10 or reference point is used to determining the location of animals 20 equipped with transponder collars 25 relative to the reference point. The location determination is based on the propagation delay of uniquely coded reply signals transmitted to the beacon 10 as prompted by interrogation transmissions of beacon 10.

The duration of reply signal propagation delay is directly proportional to the distance between the beacon 10 and the transponder collar 25 as the propagation of sound through the atmosphere is a known constant. The delay is detected by the beacon 10 and compared to a user selected threshold, if the elapsed time of the propagated reply signal is less than the user selected threshold, corresponding to the desired control distance, a correction pulse is enabled by the communication beacon 10 to activate the stimulus delivery of animal transponder collar 25.

Referring more specifically to FIG. 2, there is shown a functional block diagram of the transmission beacon 10. The transmission beacon 10 includes a power section 35, an alarm stage 50, a processing stage 55, an amplification stage 75, and a communication stage 95.

The power stage 35 of beacon 10 provides electrical power for beacon 10. Power stage 35 is preferably connected to an AC power source via a power cord which may include a step-down transformer for indoor applications requiring connection to a home electrical receptacle and a main power switch. In alternative embodiments, DC sources may be solely utilized or provided as back-up sources in the case of AC power interruptions.

The alarm stage 50 of beacon 10 provides audible indication of a boundary violation. An audio transducer is activated upon the transmission of a stimulus enable signal from beacon 10 to the transponder collar 25. In an alternative embodiment a visual indication may be additionally utilized or substituted in the place of the audio transducer. The visual indication is preferably a light emitting diode (LED) or low wattage light source.

The processing stage 55 of beacon 10 distinguishes reply signals from interrogation signal reflections and determines the propagation delay time of the reply signal if received within a user defined time out or "listening" period. Upon determination of the propagation delay time, the delay is compared to a user selected value corresponding to a desired control distance. If the delay value is below the user defined threshold, a stimulus enable signal is transmitted to the transponder collar 25.

Amplification stage 75 of beacon 10 receives ultrasonically communicated input from communication stage 95. The transmissions are amplified to ensure that ultrasonic signals detected by beacon 10 can be processed at TTL (transistor to transistor logic) levels by processing stage 55.

Communication stage 95 of beacon 10 receives and transmits ultrasonic signals. Three ultrasonic transducers are provided for ultrasonic communication between beacon 10 and transponder collar 25. The transducers can be positioned symmetrically such that each individual transducer accounts for a 120° range, for detecting movement about the perimeter of beacon 10 for a complete 360° perimeter. Alternatively, the transducers may be independently positioned with respect to each other for the coverage of irregular or separate exclusion areas.

Transponder Collars

Figure 3:
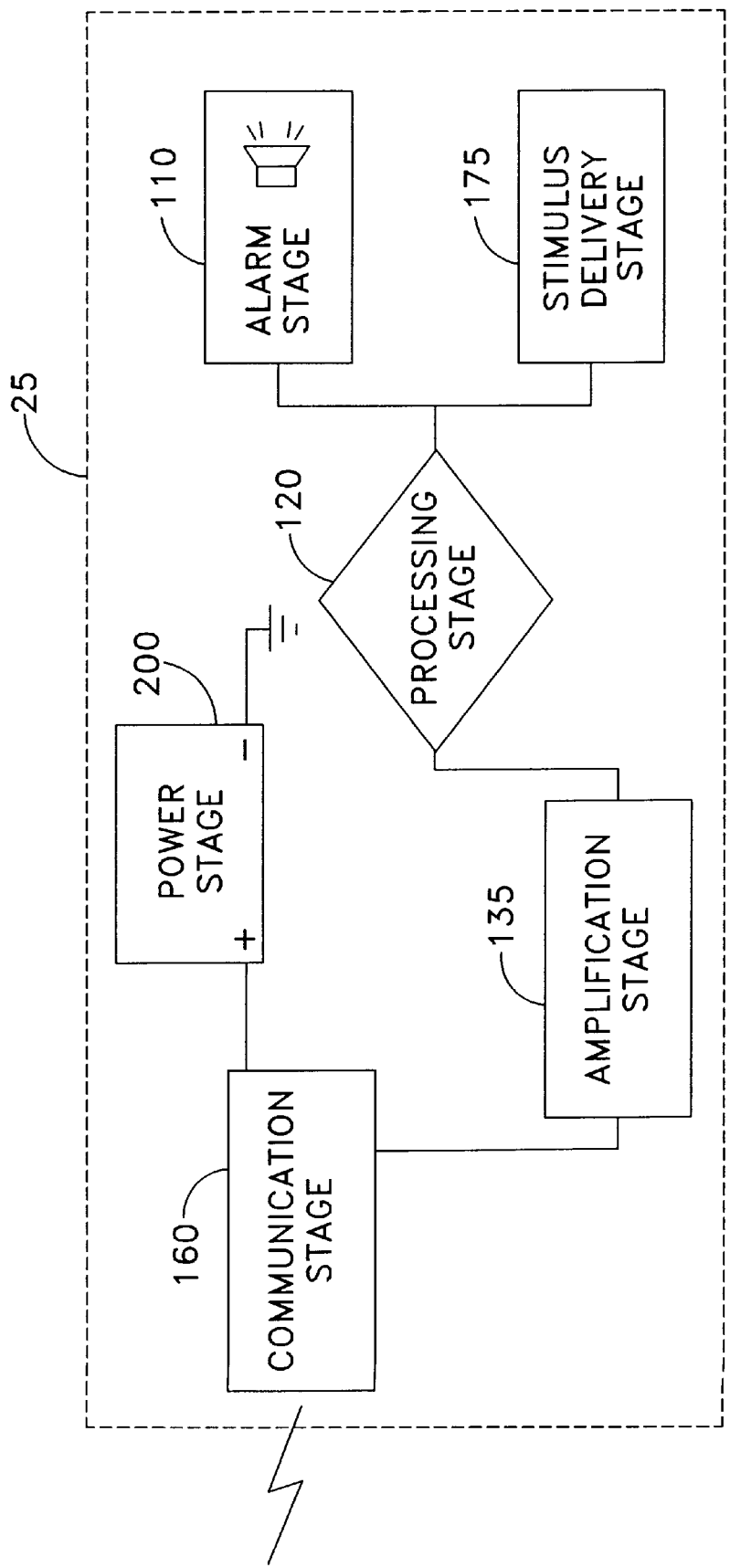
FIG. 3 is a functional block diagram of the transponder collar of the electronic boundary system for the exclusion of animals of FIG. 1.

Referring now generally to FIG. 1 and more specifically to FIG. 3, ultrasonic transponder collars 25 are secured to an animal, such as a dog 20. The location of the animal is determined by the location of the animal's transponder collar 25. As previously mentioned, the location determination is based on the propagation delay of reply signals transmitted from the transponder collar 25 to the beacon 10 as prompted by interrogation transmissions of beacon 10.

The duration of delay is directly proportional to the distance between the beacon 10 and the transponder collar 25. If the elapsed time of the propagated reply signal is less than the user selected threshold, corresponding to the desired control distance, a correction pulse is enabled by the communication beacon 10 to ultrasonically activate the stimulus delivery of animal transponder collar 25.

Referring exclusively to FIG. 3, there is shown a functional block diagram of the transponder collar 25. The transponder collar 25 includes, a power section 200 an alarm stage 110, a processing stage 120, an amplification stage 135, a communication stage 160, and a stimulus delivery stage 175.

The alarm stage 110 of transponder collar 25 provides audible indication of a boundary violation to the animal 20. An audio transducer is activated upon the transmission of a stimulus enable signal from beacon 10 to the transponder collar 25 to condition the animal to associate the alarm sound with boundary enforcement. Alternatively the alarm section 110 of transponder collar 25 may be activated to warn the animal of an impending stimulus. For example, the alarm may be triggered by beacon 10 if the reply signal indicates that the animal is close to a boundary. In an alternative embodiment a visual indication may be additionally utilized or substituted in the place of the audio transducer. The visual indication is preferably a light emitting diode (LED) or low wattage light source.

The processing stage 120 of transponder collar 25 distinguishes interrogation signals from stimulus enable signals and protects animals immobilized within the exclusion area from repeated stimulus. In the case of a detected interrogation signal, the processor transmits an ultrasonic reply signal via communication stage 160. Upon detection of a stimulus enable signal, the stimulus delivery circuitry is activated to provide a mild electrical stimulus to the animal equipped with transponder collar 25. The processing stage 120 distinguishes interrogation signals from stimulus enable signals by the unique pulse widths of the communicated signals. Additionally, the processing stage 120 disables the collar 25 for a short period after each stimulus to allow the animal 20 an opportunity to move out of the exclusion area 30. Moreover, the processing stage 120 disables the collar stimulus delivery for animals immobilized or trapped within the preselected range of the beacon 10.

Amplification stage 135 of transponder collar 25 receives ultrasonically communicated input from communication stage 160. The detected inputs of communication stage 160 are amplified to ensure that the ultrasonic signals detected by transponder collar 25 can be processed at TTL (transistor to transistor logic) levels by processing stage 120.

Communication stage 160 of transponder collar 25 receives and transmits ultrasonic signals. An ultrasonic transducer is provided for ultrasonic communication between transponder collar 25 and beacon 10.

Stimulus delivery stage 175 of transponder collar 25 delivers a mild electric shock to an animal 20 through a plurality of collar contacts. The stimulus delivery stage 125 is enabled by the processing stage 120 upon detection of a stimulus enable signal transmitted to the communication stage 160 of collar 25.

Circuit Operation

I. Communication Beacon

Communication beacon 10 has internal circuitry within a weatherproof housing having an outer facing surface for the positional mounting of ultrasonic transducers.

Figure 4:
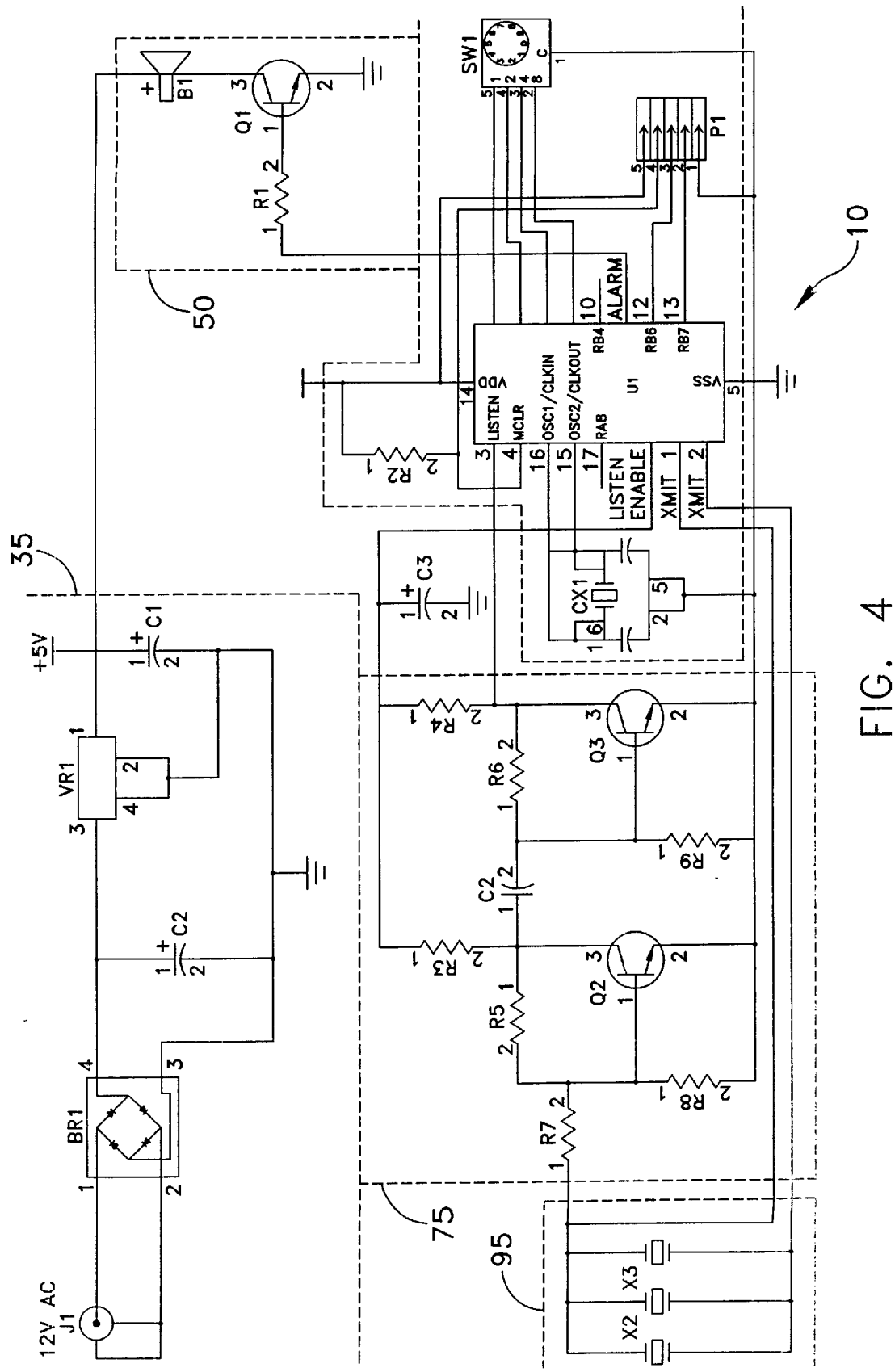
FIG. 4 is a schematic diagram of the communication beacon of the echo-ranging electronic boundary system for the exclusion of animals of FIG. 1.
Figure 5:
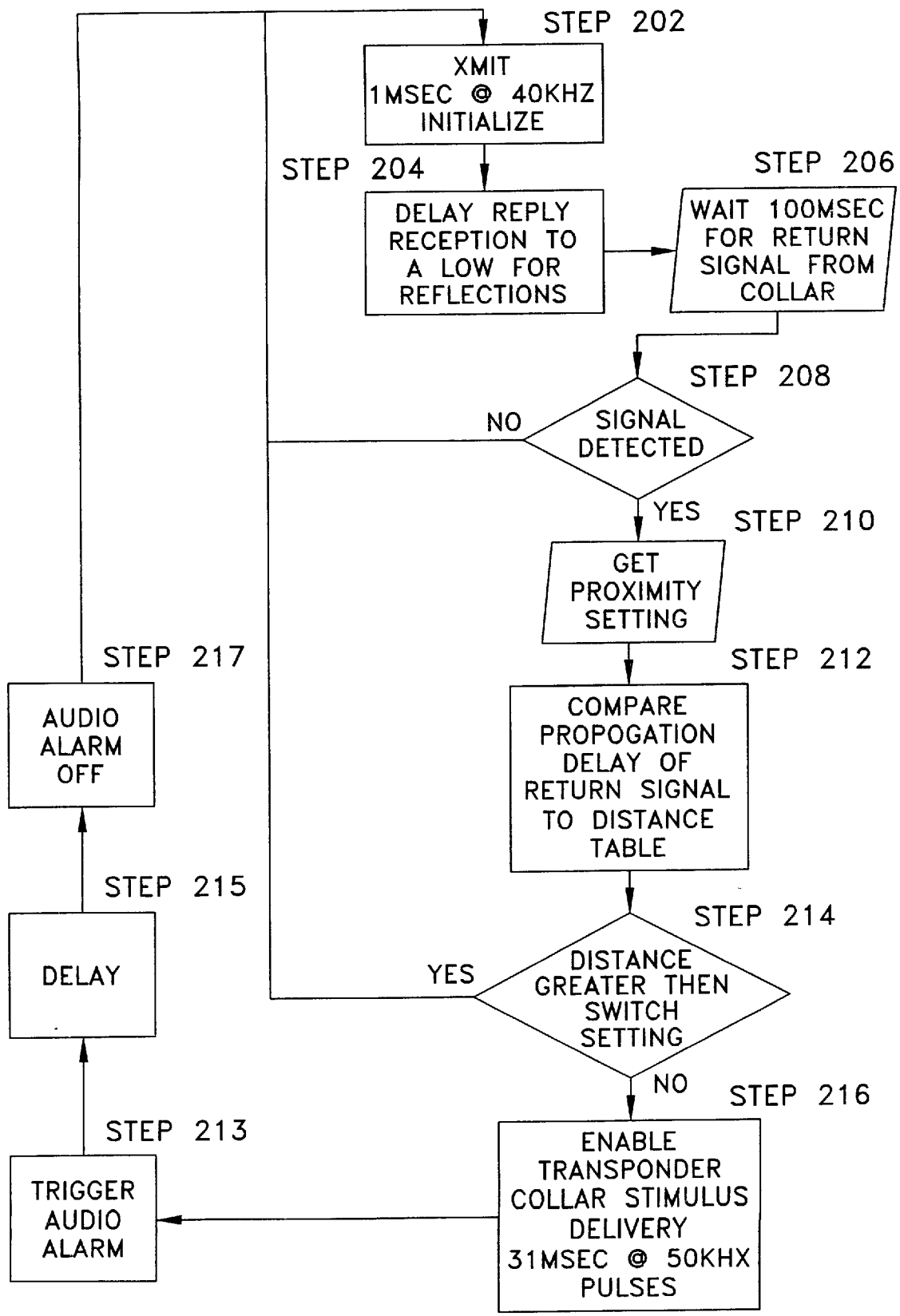
FIG. 5 is a flow chart of the operation of the CPU of the communication beacon of FIG. 2.

Referring now to FIGS. 4 and 5, Operation of the communication beacon 10 is governed by a CPU, preferably a PIC16C84S018 microcontroller U1 such as manufactured by Microchip Technology Inc., of Chandler, Ariz., typically operating at one instruction per microsecond. The microcontroller U1 is powered by a 5 v supply voltage, Vdd, at a clock frequency of 4 Mhz supplied by the oscillator C×1 across the OSC1 and OSC2 inputs of U1. The microcontroller U1 of communication beacon 10 includes previously described circuit stages or "sub-sections" utilized to implement the processing functions of U1, namely communication stage 95 for transmitting and receiving signals, Amplification stage 75 for increasing the level of received signals, and an alarm stage 50 for providing audible notification of a stimulus enable transmission.

More specifically, operating power is supplied to the microcontroller U1 of beacon 10 by a voltage regulator VR1 that provides a regulated supply voltage of 5 volts. The regulator VR1, in turn, is powered by an AC source which is rectified by full wave bridge BR1. Filter capacitors C2 and C1 remove vestigial components of alternating current remaining subsequent to the rectification of BR1. In the preferred embodiment the AC source is 12 v as supplied by a plug-in wall transformer through AC jack J1, the wall transformer stepping down an external AC source, preferably provided by a local AC voltage supply, typically a 120 v 60 hz residential supply.

I/O terminals of the microcontroller, designated as Listen Enable, XMIT1, XMIT2, Alarm, and Listen in conjunction with data port DP, are employed along with the aforementioned circuit sub-sections to provide the following functions.

Listen Enable is an output terminal which is toggled by the microcontroller U1, in accordance with internal timing registers, in order to permit the reception of ultrasonic transmissions external to beacon 10 as detected by communication stage 95. Specifically, Listen Enable terminal is connected to the biasing network of amplification stage 75. The amplification stage 75 functions to amplify the inputs of communication stage 95 to ensure that the detected signals can be processed at TTL (transistor to transistor logic) levels by the microcontroller U1.

Specifically, the Listen Enable terminal is driven to a logic "high" by microcontroller U1 to provide the DC bias of transistors Q2 and Q3 of amplification stage 75. Upon the DC biasing of amplification stage 75, sensing resistor R7 provides a path for the input of communication stage 95 to the base of pre-amplification transistor Q2, which is DC biased by the voltage division of resistors R8, R5, and R3. The amplified output of Q2 is coupled to the base of Q3 by capacitor C4 for further amplification. The DC bias of Q3 is provided by the voltage division of resistors R9, R6 and R4. Capacitor C3 provides a path to circuit ground for transient noise caused by the toggling of the Listen Enable terminal.

Listen is an I/O terminal of microcontroller U1 which is asserted subsequent to the assertion of the Listen Enable signal to detect the presence of communications from transponder collars 25 as amplified by amplification stage 75. The Listen terminal is connected to the collector of Q3 of amplification stage 75 to provide collar signals to the Listen terminal of microcontroller U1. Collar signals emanate as detected from communication stage 95 and are amplified by amplification stage 75 prior to detection by the Listen terminal.

I/O terminals XMIT1 and XMIT2 are asserted by the microcontroller U1, in accordance with internal timing registers, in order to permit the transmission of interrogation signals and stimulus enable signals from beacon 10 to transponder collar 25. The signals are propagated to transponder collar 25 through ultrasonic transducers X1, X2, and X3 of communication stage 95. During the operation of communication beacon 10, the microcontroller U1 selects the operating frequency of the communication stage 95 in accordance with a selected frequency control parameter which is consistent with the capabilities of transducers X1, X2, and X3. In the preferred embodiment an interrogation signal is one millisecond in duration at a frequency of 40 KHZ, the stimulus enable signal is a series of one millisecond signals of a frequency of 50 KHZ. The stimulus enable is distinguished from the interrogation signal by providing uniquely timed delays between the signal bursts of the stimulus enable signals which are distinguished by the animal collar 25.

Upon transmission of a stimulus enable signal, the XMIT1 and XMIT2 terminals of U1 are flip-flopped in accordance with internal timing registers and the audio alarm stage 50 is enabled to provide audible indication of the stimulus delivery to collar 25. The alarm stage 50 is activated by asserting the Alarm terminal of U1 which drives transistor Q1 of alarm stage 50 through base resistor R1. The resulting output produced at the collector of Q1 drives the piezoelectric transducer B1. In an alternative embodiment, the control parameters stored in the microcontroller U1 the microcontroller may first operate the alarm stage for a predetermined delay period. If the proper Reply signal is still detected as transmitted from collar 25, the microcontroller U1 may then operate the transducer to deliver the stimulus enable signal to collar 25.

The processing stage 55 of beacon 10 includes a proximity selection switch SW1 and a programming port P1. The proximity switch is a user selectable DIP (Dual Inline Package) or rotary switch. The switch adjusts five terminals of the data port (DP), setting a unique combination of logic bits for each proximity setting. In operation, after receiving a reply signal from collar 25 via communication stage 95, amplification stage 75 and the Listen terminal of U1, the microcontroller U1 compares the proximity setting value at the data port DP and determines whether or not the signal indicates a collared animal within the user selectable proximity setting.

Programming port P1 enables updating or reprogramming of the internal registers and control parameters of the microcontroller U1. The microcontroller U1 is programmed to recognize a condition for programming and/or data transmission wherein the VDD terminal is connected with a positive voltage, typically on an order of 12–24 volts, and wherein the MCLR terminal is maintained at a low logic level, typically at ground potential or "zero" volts. Upon detecting such a condition, the microcontroller U1 then prepares to communicate with an external programming device through programming port P1, the programming device such as that marketed by Invisible Fence Company, Inc. of Malvern, Pa. of the type disclosed in U.S. issued U.S. Pat. No. 5,533,469 on Jul. 9, 1996 incorporated herein by reference.

Additional features of the communication beacon 10 will now be described with reference to FIG. 5 wherein there is shown a logical flow diagram of the processing procedure executed by the microcontroller U1. The AC source of power stage is 35 is provided through J1 which may include a power switch, execution begins at step 201 where the microcontroller U1 initializes internal control registers and parameters to establish data port DP for receiving proximity settings, and I/O terminals XMIT1, XMIT2 for actively operating the transducers X1, X2 and X3, I/O terminals Listen Enable and Listen for receiving Reply signals from the collar 25, and the I/O terminal Alarm for indicating the transmission of a stimulus enable signal to collar 25. Included in step 201 is a software delay which delays the operation of step 202 until all circuit transients caused by power up are discharged to circuit ground.

In step 202, the microcontroller U1 toggles the XMIT1 and XMIT2 terminals to interrogate collars 25 in range of the transmissions. In the preferred embodiment the terminals are flip-flopped at a rate of every twelve microseconds for a period of one millisecond to create an acoustic burst of energy having a frequency of 40 KHZ.

In step 204 a software delay is employed prior to the assertion of the Listen Enable terminal to allow reflections of the interrogation signal in the range of 20–40 ft of the communication beacon 10 to dissipate. The value of the delay is set at a value indicative of the likely propagation delay of such local reflections.

In step 206 the Listen Enable terminal of microcontroller U1 is asserted to bias the amplification stage 75 of communication beacon 10. Additionally, after a brief delay for dissipation of biasing transients, the Listen terminal is asserted to receive Reply signal of collar 25. In the preferred embodiment the Listen and Listen Enable signal are active for a time-out period of one hundred milliseconds.

In step 208, if no Reply signal is received after 100 milliseconds the collar is determined to be out of range of beacon 10 and the microcontroller enters a loop by returning to step 202. If a Reply signal is detected by the microcontroller U1 the processing proceeds to step 210.

In step 210, the proximity setting of DIP switch SW1 is provided by data port DP and the processing proceeds to step 212.

In step 212 the proximity setting is indexed with a known value of propagation delay stored in an internal register of microcontroller U1. This propagation value is compared to the delay of the Reply signal reception relative to the interrogation signal broadcast. If the propagation delay of the received collar Reply signal is greater than the indexed value of the proximity setting the processor re-enters the Xmit loop by returning to step 202. If the propagation delay is less than the indexed value, the processor enables the XMIT1 and XMIT2 I/O terminals to deliver a stimulus enable signal to collar 25. In the preferred embodiment, the stimulus enable signal is three consecutive one millisecond burst of 50 KHZ sound separated by twenty millisecond delays.

In step 213, the Alarm I/O terminal is asserted activating alarm stage 50 to provide audio indication of the stimulus enable transmission. The duration of the alarm is dictated by a software delay, step 215, and de-activated by step 217 prior to the return of the processor to the XMIT loop, step 202.

Circuit Operation
II. Transponder Collar

Transponder Collar 25 includes high voltage probes for contacting an animal 20. The collar 25 is sealed in a weatherproof housing, having an ultrasonic transducer positioned to transmit and receive ultrasonic transmission. The collar is typically secured about the neck of an animal, such as a dog.

Figure 6:
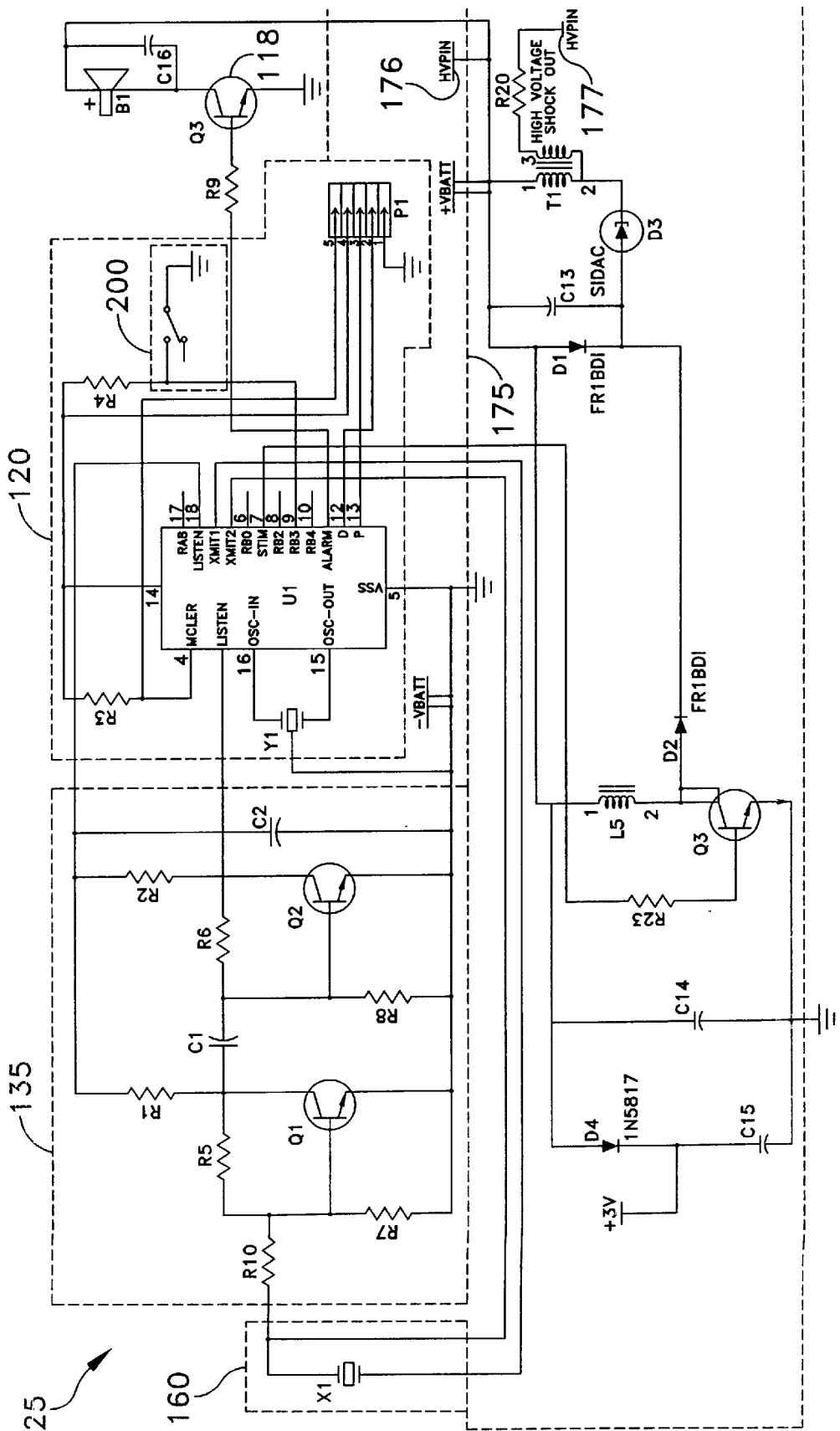
FIG. 6 is a schematic diagram of the transponder collar of the echo-ranging of the echo-ranging electronic boundary system for the exclusion of animals of FIG. 1.
Figure 7:
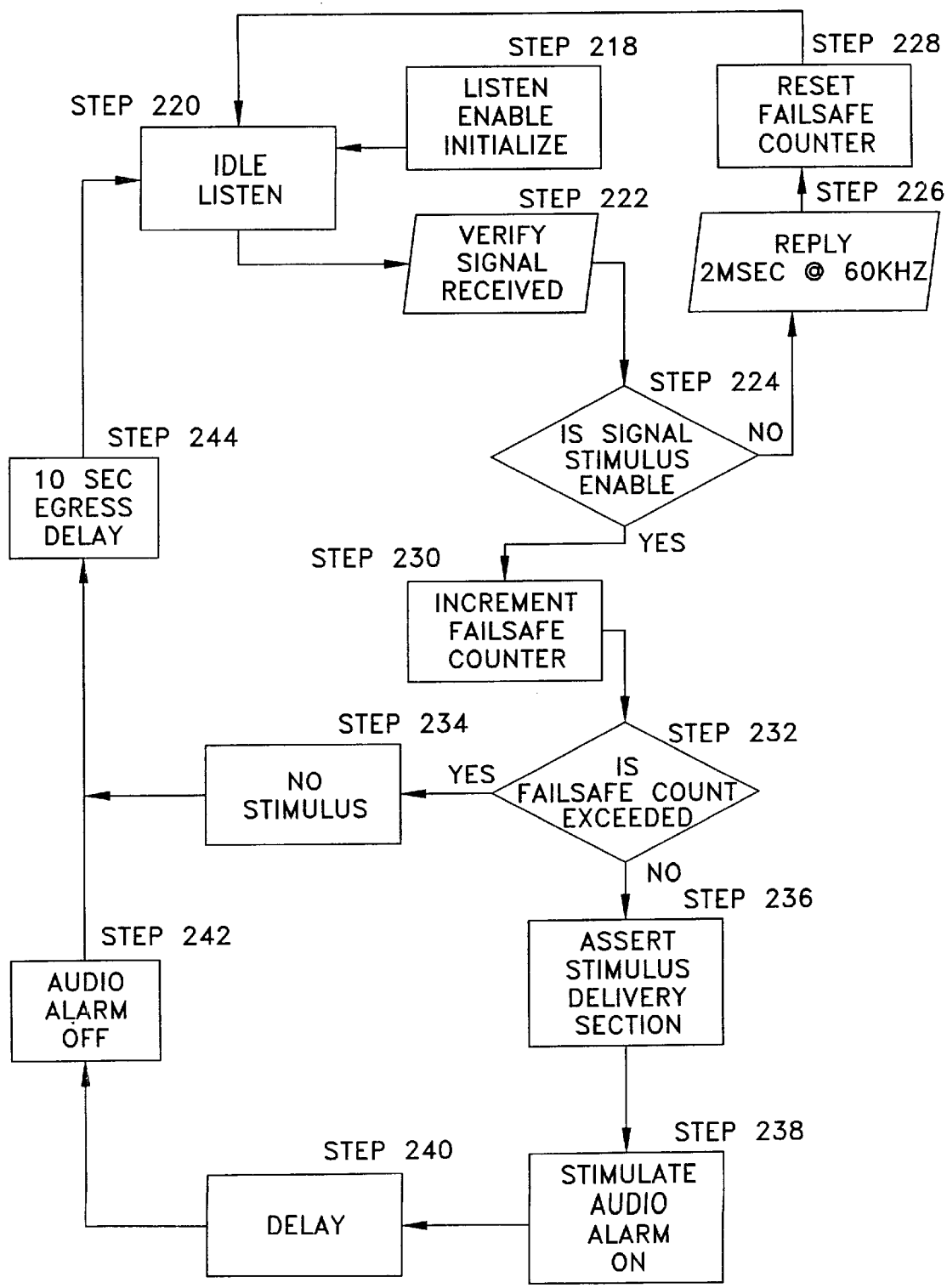
FIG. 7 is a flow chart of the operation of the CPU of the transponder collar of FIG. 3.

Referring now to FIGS. 6 and 7, Operation of the collar 25 is governed by a CPU, preferably a PIC16LC84 microcontroller such as manufactured by Microchip Technology Inc., of Chandler, Ariz., designated U1 in FIG. 6. The microcontroller U1 is powered by a 5 v supply voltage, Vcc, at a clock frequency of 4 Mhz supplied by the oscillator Y1 across the OSC-In and OSC-Out inputs of U1. The microcontroller U1 of transponder collar 25 includes the previously described circuit stages or "sub-sections" to implement the processing functions of U1, namely power stage 200 for operating the collar 25, communication stage 160 for transmitting and receiving signals, amplification stage 135 for increasing the level of the detected signals of communication stage 160, alarm stage 50 for providing audible notification of a stimulus enable transmission, and stimulus delivery stage 175 for delivering a control stimulus to an animal 20.

More specifically, operating power is supplied to the microcontroller U1 of collar 25 by a DC power source, typically a battery connected to the internal circuitry of collar 25 through power switch S1. I/O terminals of the microcontroller, designated as Listen Enable, Listen, XMIT1, XMIT2, Alarm, and Stimulate in conjunction with data port DP, are employed along with the aforementioned circuit sub-sections to provide the following functions.

Listen Enable is an output terminal which is toggled by the microcontroller U1, in accordance with internal timing registers, in order to permit the reception of ultrasonic transmissions external to the collar 25 as detected by collar communication stage 160. Specifically, the Listen Enable terminal is connected to the biasing network of amplification stage 135. The amplification stage 135 functions to amplify the detected inputs of communication stage 160 to ensure that the detected signals can be processed at TTL (transistor to transistor logic) levels by the microcontroller U1.

Specifically, the Listen Enable terminal is driven to a logic "high" by microcontroller U1 to provide the DC bias of transistors Q1 and Q2 of amplification stage 135. Upon the DC biasing of amplification stage 135, sensing resistor R10 provides a path for the input of communication stage 160 to the base of pre-amplification transistor Q1, which is DC biased by the voltage division of resistors R10, R5, and R1. The amplified output of Q1 is coupled to the base of Q2 by capacitor C1 for further amplification. The DC bias of Q2 is provided by the voltage division of resistors R8, R6 and R2. Capacitor C2 provides a path to circuit ground for transient noise caused during the toggling of the Listen Enable terminal.

The Listen or "Idle" function of collar 25 is activated by the Listen I/O terminal of microcontroller U1 which is asserted subsequent to the assertion of the Listen Enable signal. Assertion of the Listen terminal functions to detect the presence of communications from communication beacon 10 as detected by communications stage 160 and amplified by amplification stage 135. The Listen terminal is connected to the collector of Q2 of amplification stage 135 to provide beacon interrogation signals or stimulus enable signals to the Listen terminal of microcontroller U1.

I/O terminals XMIT1 and XMIT2 are asserted by the microcontroller U1, in accordance with internal timing registers, in order to permit the transmission of collar Reply signals from collar 25 to communication beacon 10. The signals are propagated through ultrasonic transducer X1 of communication stage 160. During the operation of transponder collar 25, the microcontroller U1 selects the operating frequency of the communication stage 160 in accordance with a selected frequency control parameter which is consistent with the capabilities of transducers X1, X2, and X3. In the preferred embodiment a Reply signal is two millisecond in duration at a frequency of 60 KHZ. Additionally, X1 receives stimulus enable signals from beacon 10 provided as uniquely timed signal bursts which are distinguished by the processor U1 of collar 25. In an alternative embodiment a plurality of transponder collars 25 may be utilized in conjunction with beacon 10 each having its own unique Reply signal. Moreover, a plurality of unique stimulus enable signals can be similarly transmitted to selectively stimulate one of a plurality of collared animals.

The Alarm terminal of U1 is asserted upon detection of a stimulus enable signal. The audio alarm stage 50 is enabled to provide audible indication of the stimulus delivery to collar 25. The alarm stage 50 is activated by asserting the Alarm terminal of U1 which drives transistor Q3 of alarm stage 110 through base resistor R9. The resulting output produced at the collector of Q1 drives the piezoelectric transducer B1. C16 is placed in parallel with transducer B1 to smooth the transition of collector switching voltages. In an alternative embodiment, the control parameters stored in the microcontroller U1 may first operate the alarm stage 110 for a predetermined delay period. If the proper Stimulus Enable signal is still detected as transmitted from beacon 10, the microcontroller U1 may then operate the transducer to deliver the stimulus enable signal to collar 25.

The Stimulate terminal of microcontroller U1 pulses the base of transistor Q14. The assertion of the Stimulate signal discharges coil L5.

Specifically the toggling of the Stimulate terminal turns-on the transistor Q14 which discharges the a high voltage current pulse from L5 to flow through diode D2 to capacitor C13 of the stimulus delivery stage 175 as long as the Stimulate terminal is asserted. D4, C15, C14, R23, Q14 and L5 acting as a flyback oscillator for providing a periodic high voltage current pulse. The voltage across capacitor 99 will increase until the voltage reaches the threshold voltage of a threshold voltage device such as a bilateral trigger diode or DIAC D3. When the threshold is reached, the charge on capacitor 99 will be discharged through the primary coil of transformer T1. In the preferred embodiment the Stimulate signal is one hundred milliseconds in duration.

In an alternative embodiment, threshold stage 85 may a comparator circuit with one input permanently set at a voltage reference such that the comparator is triggered by an additional input voltage greater than the reference voltage. Moreover, a Silicon Controlled Rectifier may be connected to have its gate voltage delayed until the oscillatory signal has reached the desired level.

Transformer 102 is a "step-up" transformer which increases the voltage in its secondary winding as energy is transferred from the primary winding by a degree defined by the transformer turns ratio. The transfer of energy is enabled when the threshold of DIAC D3 is reached. The stimulus is delivered to the animal 20 through at least two of a plurality of contact probes such as 176 and 177 which contact the animal.

Finally, the processing stage 120 of transponder collar 25 includes a programming port P1.

Programming port P1 enables updating or reprogramming of the internal registers and control parameters of the microcontroller U1. The microcontroller U1 is programmed to recognize a condition for programming and/or data transmission wherein the VCC terminal is connected with a positive voltage, typically on an order of 12–24 volts, and wherein the MCLR terminal is maintained at a low logic level, typically at ground potential or "zero" volts. Upon detecting such a condition, the microcontroller U1 then prepares to communicate with an external programming device through programming port P1.

Additional features of the transponder collar 25 will now be described with reference to FIG. 7 wherein there is shown a logical flow diagram of the processing procedure executed by the microcontroller U1. As the DC source of power stage 200 is provided through S1, execution begins at step 218 where the microcontroller U1 initializes internal control registers and parameters to establish data port DP for receiving programming instructions from data port P1, and I/O terminals XMIT1, XMIT2 for actively operating the transducer X1, I/O terminals Listen Enable, Listen for receiving interrogation and stimulus enable signals from communication beacon 10, Stimulate for delivering a stimulus to an animal 20, and the I/O terminal Alarm for indicating the reception of a stimulus enable signal by the collar 25. Included in step 218 is a software delay which delays the operation of step 220 until all circuit transients caused by power up are discharged to circuit ground.

In step 220, the microcontroller U1 monitors the transducer X1 for interrogation and stimulus enable signals transmitted by beacon 10. In the preferred embodiment the Interrogation signal a one millisecond acoustic burst of energy having a frequency of 40 KHZ. The stimulus enable signal being three consecutive 50 KHZ bursts of one millisecond separated by a unique delay period. If no signal is detected the collar continues to monitor transducer X1 or "Idle."

Upon detection of a signal, step 222 verifies and distinguishes received signals.

In step 224 the signal is determined to be a Stimulus Enable or an Interrogation signal. If the signal is detected as an interrogation signal the processor moves to step 226 in which XMIT1 and XMIT2 terminals of U1 are asserted to communicate a Reply signal to communication beacon 10. As the Reply signal is transmitted step 228 resets the failsafe counter and the processor returns to step 220 for further reception of beacon transmissions. If the signal is detected as being a Stimulus Enable in step 224, step 230 increments the failsafe counter.

In step 232 the failsafe count is compared to a maximum count parameter stored within the microcontroller U1. If the failsafe has been incremented beyond this parameter the processor proceeds to step 234.

In step 234 the processor does not stimulate the animal and returns the processor to step 220 for further communication with beacon 10. The failsafe ensures that animals immobilized within stimulation range of beacon 10 are not subject to repeated stimulus.

If the failsafe count is not exceeded in step 232 the Stimulate terminal is asserted in step 236 to deliver the stimulus to the animals.

In step 238 the Alarm terminals is asserted delivering an audible indication to the animal along with the control stimulus.

In step 240 a software delay acts to prolong the audible indication of alarm stage 110.

Step 242 turns the audible indication off by toggling the Alarm terminal to the inactive state, the processor then returns to step 220 after an egress delay provided to allow a stimulated animal time to move away from the beacon 10 before receiving a second stimulation in step 244.

The terms and expressions which have been employed are used as terms of description and not of limitation. There is no intention in the use of such terms and expressions of excluding any equivalents of the features shown and described or portions thereof. It should also be appreciated that various functional components of the invention may be implemented as analog-electric circuits, application-specific circuits, or preferably, as one or more appropriately-programmed logic circuits.

That which is claimed is:

1. A ranging boundary system for animals, comprising:
   a beacon having a beacon transmitter operable repetitively to emit an ultrasonic wave transmission with at least one of a frequency and pulse characteristic, as an ultrasonic interrogation signal propagating from the beacon, the beacon having a beacon receiver for detecting an ultrasonic reply signal with at least one of a frequency and pulse characteristic, and a processor for determining a time between emission of the ultrasonic interrogation signal and reception of the ultrasonic reply signal;
   a portable transponder mountable on an animal, the portable transponder having an ultrasonic transponder receiver for detecting the ultrasonic interrogation signal of the beacon, and a transponder transmitter operable to emit the ultrasonic reply signal in response to reception of the ultrasonic interrogation signal of the beacon;

a processor associated with the beacon, the processor timing a period between emission of the ultrasonic interrogation signal from the beacon and reception of the ultrasonic reply signal at the beacon, said period representing a distance between the beacon and the animal;

a stimulus generator associated with the portable transponder, the stimulus generator applying a selected stimulus to the animal under selected conditions;

wherein the processor is programmed to determine a time interval between emission of the ultrasonic interrogation signal and receipt of the ultrasonic reply signal, the processor applying a minimum threshold to the time interval and signaling to the stimulus generator when the time interval approaches a predetermined boundary level above said minimum threshold.

2. The ranging boundary system of claim 1, wherein the time interval is reduced approaching the predetermined boundary level, whereby the stimulus generator is signaled when the animal approaches an exclusion zone adjacent to the beacon.

3. The ranging boundary system of claim 1, wherein the minimum threshold is sufficient to exclude echoes of the ultrasonic interrogation signal from surfaces adjacent to the beacon.

4. The ranging boundary system of claim 2, wherein the minimum threshold defines a safe zone adjacent to the beacon, whereby the processor does not signal the stimulus generator when an animal is trapped in the exclusion zone.

5. The ranging boundary system of claim 1, wherein the stimulus delivered to the animal comprises an audible warning.

6. The ranging boundary system of claim 5, wherein the audible warning is emitted by the portable transponder.

7. The ranging boundary system of claim 1, wherein the stimulus delivered to the animal comprises an electrical shock.

8. The ranging boundary system of claim 1, wherein the beacon is substantially centrally positioned within a predefined area in which animals are to be excluded.

9. The ranging boundary system of claim 1, wherein a plurality of said beacons are located in a predefined area to produce a non-uniform animal exclusion zone.

10. The ranging boundary system of claim 1, wherein the processor associated with the beacon is programmed to distinguish between the ultrasonic interrogation signal and the ultrasonic reply signal.

11. The ranging boundary system of claim 1, wherein the processor associated with the beacon generates the ultrasonic interrogation signal and signals the stimulus generator using signals having distinct pulse characteristics.

12. The ranging boundary system of claim 1, wherein the processor associated with the beacon generates the ultrasonic interrogation signal and signals the stimulus generator using signals having distinct ultrasonic frequencies.

13. The ranging boundary system of claim 10, wherein the ultrasonic reply signal is encoded.

14. The ranging boundary system of claim 1, wherein the ultrasonic interrogation signal and the ultrasonic reply signal have different ultrasonic frequency carriers.

15. The ranging boundary system of claim 8, wherein the beacon comprises a plurality of ultrasonic transducers positioned symmetrically to cover a field of view of 360° about the beacon.

16. The ranging boundary system of claim 15, wherein the plurality of ultrasonic transducers can define different said predetermined boundary levels.

17. The ultrasonic ranging system of claim 7, wherein the processor is operable to count instances of signaling the stimulus generator to deliver said electrical shock, and wherein the processor compares the count to a predetermined failsafe maximum and discontinues signaling for the electrical shock when the failsafe maximum is reached, until reset.

* * * * *